United States Patent [19]

Huber

[11] Patent Number: 4,807,735

[45] Date of Patent: Feb. 28, 1989

[54] GUIDE ARRANGEMENT FOR A CONVEYOR TRACK

[75] Inventor: Thomas Huber, Iffeldorf, Fed. Rep. of Germany

[73] Assignee: Bavaria Cargo Technologie GmbH, Munich, Fed. Rep. of Germany

[21] Appl. No.: 160,240

[22] Filed: Feb. 25, 1988

[30] Foreign Application Priority Data

Oct. 2, 1987 [DE] Fed. Rep. of Germany ....... 3733406

[51] Int. Cl.$^4$ ............................................. B65G 13/00
[52] U.S. Cl. ................................. 193/35 B; 244/137.1
[58] Field of Search ........... 198/721; 193/35 R, 35 B, 193/37; 244/137.1, 137.3; 410/79, 92

[56] References Cited

U.S. PATENT DOCUMENTS

| | | | |
|---|---|---|---|
| 3,139,963 | 7/1964 | Nadler et al. .......................... | 193/37 |
| 3,262,588 | 7/1966 | Davidson ...................... | 244/137.1 X |
| 3,370,727 | 11/1965 | Shaw ..................................... | 193/35 R |
| 3,612,316 | 10/1971 | Baldwin et al. .............. | 244/137.1 X |
| 3,741,504 | 6/1973 | Alberti et al. .................. | 198/788 X |
| 3,899,092 | 8/1975 | Nordstrom .................... | 244/137.1 X |
| 4,050,561 | 9/1977 | Seitz .................................. | 193/35 R |

FOREIGN PATENT DOCUMENTS 106591  4/1984  European Pat. Off. ......... 244/137.1

Primary Examiner—Frank E. Werner
Assistant Examiner—James R. Bidwell
Attorney, Agent, or Firm—Sughrue, Mion, Zinn, Macpeak, and Seas

[57] ABSTRACT

A guide arrangement for a conveyor track includes a guide bar portion arranged along at least a part of each side edge of a plate device forming the center part of the conveyor track, each guide bar portion being of an inverted generally L-shaped configuration for engaging over a corresponding edge portion of an article such as a freight container to be conveyed therealong. A plurality of rollers are provided in respective openings in the plate device adjacent the guide bar portions, to support the article above the plate device. Each roller has an enlarged portion at its outward end for guiding the edge of the article to be conveyed, thereby to hold it at a spacing from the respectively associated guide bar portion.

4 Claims, 2 Drawing Sheets

GUIDE ARRANGEMENT FOR A CONVEYOR TRACK

BACKGROUND OF THE INVENTION

The present invention relates generally to a conveyor track and more particularly to a guide arrangement therefor.

Roller-type or ball-type conveyor tracks in which articles to be conveyed thereon are supported movably on a plurality of support rollers or balls are often used for example in connection with air freight traffic and often include a guide arrangement which serves to provide lateral guidance for an article such as a freight container which is being transported on the conveyor track. The guide arrangement also serves to secure a freight container in the lateral and vertical directions to prevent it from shifting when in flight.

A roller conveyor track with guide arrangement of that kind is described for example in German patent application No. P 37 24 125.7. The guide elements of the guide arrangement are in the form of individual hook-like components which are in the form of an inverted L-shape and which are disposed at spacings from each other along the side edges of a central panel portion of the conveyor track. A container which is to be conveyed on such a conveyor track is provided at its lower side edges which extend longitudinally of the container in the direction of conveying movement with a respective guide web portion. During a conveying operation and when the freight container is stationary on the conveyor track, a plurality of the guide elements of the guide arrangement thereof engage loosely over the top of the respective guide web portions. In that way, in the rest condition, the freight container is effectively prevented from shifting laterally and vertically. When the container is being conveyed along the conveyor track however, serious problems may frequently arise as even slight tilting or twisting of the freight container relative to the direction in which it is being conveyed means that for example a front corner of the container comes into hooking engagement with the next following guide element and thus the conveying movement can be abruptly halted and the container jammed on the conveyor track.

SUMMARY OF THE INVENTION

An object of the present invention is to provide a guide arrangement for a conveyor track, for more reliably guiding articles to be moved along same.

Still another object of the present invention is to provide a guide arrangement for a conveyor track intended more specifically for guiding freight containers, which is capable of preventing such a container from twisting and jamming in the course of a conveying operation.

Still another object of the present invention is to provide a conveyor arrangement having a guide means which can guide articles during the conveying movement with a reduced level of friction in the guiding action, while also providing a retaining action when an article is stationary on the conveyor track, to prevent substantial movements of the articles on the conveyor track.

In accordance with the present invention, these and other objects are attained by a guide arrangement for a conveyor track which has elongate panel means with side edges extending in the longitudinal direction of the conveyor track, the guide arrangement comprising guide bar portions which extend along respective ones of the side edges of the conveyor track in the conveying direction, at least over a part of the length of the respective side edges, and which are of an inverted substantially L-shaped cross-section, adapted to engage over a side portion of an article to be conveyed on the conveyor track. The panel means has a plurality of openings therein, at spacings from each other, along the respective guide bar portions, while guide rollers which are freely rotatably mounted transversely to the direction of conveying movement are disposed in respective ones of the openings. The guide rollers each provide a circumferential surface which projects above the surface of the panel means, thereby to support an article thereon, each guide roller being provided at an end thereof which is towards the adjacent guide bar portion with an enlarged-diameter guide shoulder which is adapted during a conveying operation to guide the side portion of a said article at a spacing from the respective guide bar portion.

The above-defined configuration in accordance with the invention derives from the realisation that a freight container cannot be prevented from twisting and becoming jammed during transportation thereof on the conveyor track simply by the guide elements being in the form of an at least partially continuous guide bar portion at each side of the conveyor track, for in that case the fact that the guide portion on a respective freight container bears against an associated side wall of an extended guide bar portion over a substantial surface area would give rise to an excessive high level of friction which would thus impede the movement of the container on the conveyor track and would tend to result in overloading of the drive elements of the conveyor track. The invention therefore provides that, although the guide elements are in the form of at least partially continuous guide bar portions extending along respective ones of the side edges of the panel means of the conveyor track, at least over a substantial part of the length of those side edges, at the same time, to reduce the frictional effect referred to above, disposed along each guide bar portion and mounted in the panel means of the conveyor track are guide rollers on which an article such as a freight container is supported for rolling movement thereof, while in addition the article is held at a lateral spacing relative to the guide bar portion by the enlarged-diameter guide shoulders on the respective guide rollers. Therefore during a conveying operation the article to be conveyed is guided laterally by the guide shoulders on the guide rollers while when the article is stationary, in the event of shocks or other disturbances while in flight, the freight container is prevented from moving laterally and vertically by the guide bar portions.

A preferred embodiment of the invention provides that each guide roller is axially displaceably mounted in its respective opening and is biased away from the guide bar portion adjacent thereto, by suitable spring means. That configuration provides that, although the guide portions on the respective container on the conveyor track are guided at a spacing relative to the adjacent guide bar portions during a conveying operation, in the stationary condition and when lateral shocks occur while in flight, the respective guide rollers can be displaced axially on their respective shaft against the spring biasing force acting thereon, to such an extent that the lateral forces applied by the container supported on the rollers can be carried by the adjacent guide bar portion which provides a strong and stable support effect, so that such lateral forces do not act unnecessarily on the mounting means of the guide rollers.

In another preferred feature of the invention, the spring means is in the form of a pack of plate springs which is supported at one end against the inward side of the associated opening accommodating the guide roller while at the other end the plate springs bear against a stationary mounting element of the guide roller in question.

A further preferred feature of the invention provides that each guide bar portion is formed integrally with the panel member from a composite fiber material while each guide means may preferably also comprise such a material.

Further objects, features and advantages of the present invention will be apparent from the following description of a preferred embodiment thereof.

DESCRIPTION OF THE PREFERRED EMBODIMENT

Figure 1:
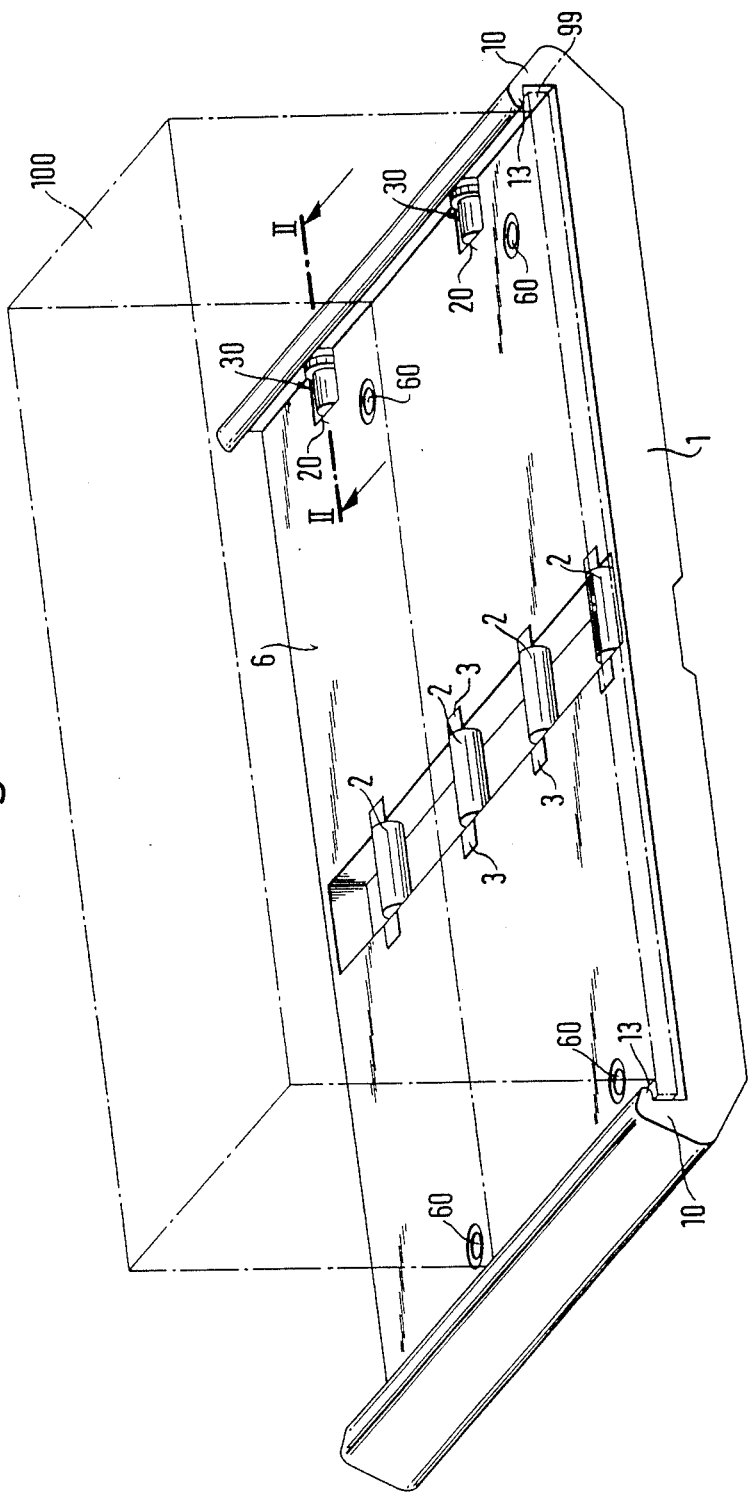
FIG. 1 shows a portion formed by an individual unit of a roller conveyor track with guide arrangement, in accordance with the principles of the present invention, a freight container to be conveyed thereon being indicated in dash-dotted lines.

Referring firstly to FIG. 1, shown therein is a component unit of a roller conveyor track as is described in greater detail in the above-mentioned German patent application No. P 37 24 125.7. The roller conveyor track illustrated comprises a panel member 1 which is produced for example from a composite fiber material, having a substantially flat top surface as indicated at 6. The panel member 1 forms a central bed portion of the unit, a plurality of such units being fitted together to provide the roller conveyor track.

The panel member 1 has a longitudinal depression which extends in the direction of conveying movement on the conveyor track, substantially centrally of the panel member 1, and accommodating a plurality of support rollers 2 which are disposed at spacings from each other in the direction of conveying movement. The rollers 2 are rotatably mounted in the depression in the panel member 1 by means of snap-fitted holders 3. The individual rollers 2 may be in the form of drive rollers in accordance with German patent application No. P 37 24 126.5 (U.S. Ser. No. 160,427 filed Feb. 25, 1988) or free-running support rollers as disclosed in German patent application No. P 37 24 114.1 (U.S. Ser. No. 160,239).

In addition, the panel member 1 has a plurality of fixing elements as indicated at 60 in FIG. 1, which are disposed at respective sides of the central row of rollers 2 for fixing the roller conveyor track to the floor of the freight compartment of an aircraft.

Figure 2:
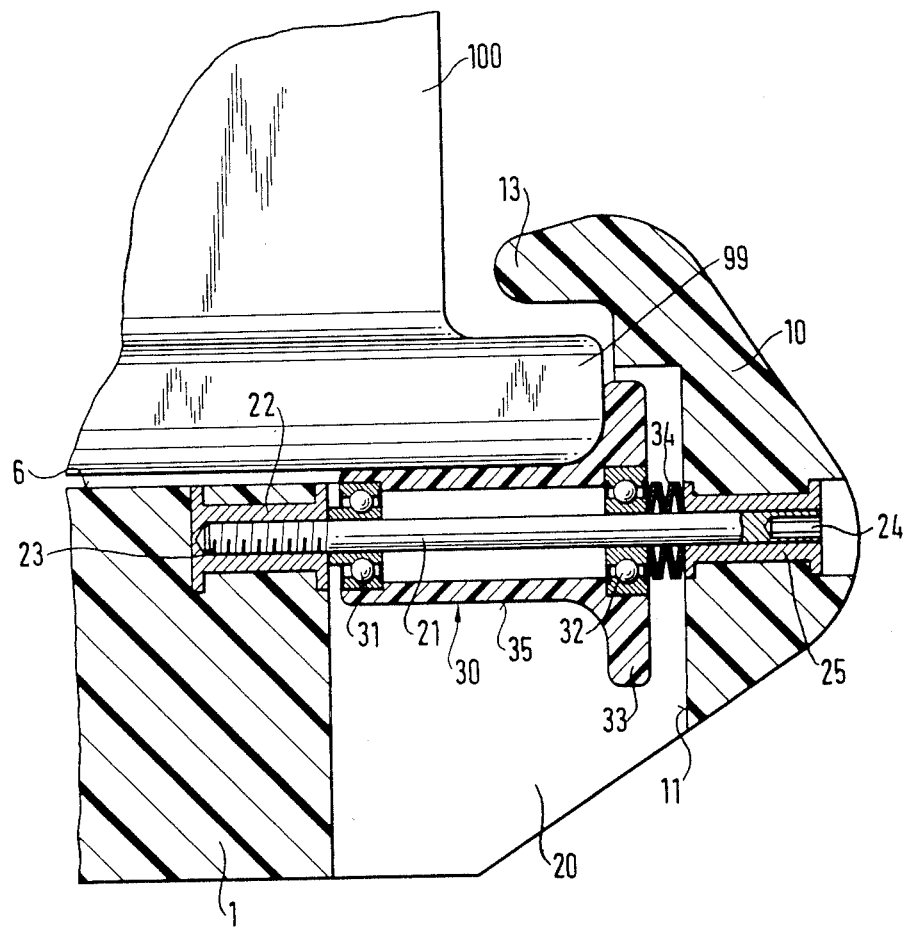
FIG. 2 is a view on an enlarged scale in section taken along line II—II in FIG. 1 of part of an embodiment of a guide arrangement in accordance with the invention.

Arranged at each of the side edges of the panel member 1, extending in the direction of conveying movement of the conveyor track, are respective guide devices which each comprise a guide bar portion 10 which is formed integrally with the panel member 1, and a plurality of guide rollers 30 which are mounted freely rotatably adjacent to the respective guide bar portion 10 in suitable openings indicated at 20 in FIG. 2, in the panel member 1.

It will be readily seen from both FIGS. 1 and 2, each guide bar portion 10 extends upwardly above the top surface 6 of the panel member 1 and is of a cross-section corresponding to an inverted generally L-shaped configuration, defined by a substantially vertically upwardly extending support portion (not referenced) and a generally horizontally extending transverse web portion 13 which is disposed at a vertical spacing from the top surface 6 of the panel member 1. That cross-sectional configuration of the respective guide bar portion 10 is such that it engages over and at a spacing from a lateral guide web or limb portion indicated at 99 in FIG. 2 at the adjacent lower longitudinally extending side edge of an article shown as a freight container 100 on the conveyor track. The side edge portions 99 of a respective freight container 100 are thus freely movable in juxtaposed relationship with the guide bar portion 10, by virtue of the spacing therebetween, as can be clearly seen from FIG. 2.

As can also be best seen from FIG. 2, each guide roller 30 comprises a substantially hollow-cylindrical body which preferably consists of a composite fiber material and which, at the axial end which is towards the adjacent guide bar portion 10, carries a guide shoulder as indicated at 33, which is of larger diameter than the remainder of the cylindrical body of the guide roller 30. Arranged at the two axial ends of the guide roller 30 and disposed in the interior of the body thereof are respective rolling bearing assemblies 31 and 32 respectively. The outer bearing race of each of the two rolling bearing assemblies 31 and 32 is non-rotatably connected to the body of the respective guide roller 30. The guide roller 30 is thus rotatably mounted on a shaft or spindle 21 in the corresponding opening 20 in the panel member 1 by means of the two rolling bearing assemblies 31 and 32 in such a way that the circumferential surface 35 of the guide roller 30 projects slightly above the top surface 6 of the panel member 1 and is thus proud thereof, so that the bottom of a freight container 100 is thus movably supported on the guide rollers 30. That situation is clearly visible in FIG. 2 from which the spacing between the top surface 6 of the panel member 1 and the underneath surface of the freight container 100 is clearly visible.

The lateral edge of the guide portion 99 at the longitudinally extending edge of a respective freight container 100 bears against the radially inwardly facing surfaces of the guide shoulders 33 on the respective guide rollers 30, as is also clearly visible in FIG. 2, and is thereby held at a spacing from the vertical side surface 11 of each of the openings 20 in the panel member 1 and also at a spacing from the adjacent side surface of the guide bar portion 10, as is clearly shown in FIG. 2.

At its left-hand end, the shaft or spindle 21 of each guide roller 30 has a male screwthread 23 thereon, with which it is screwed into a female screwthread in a screwthreaded bush or sleeve 22 which is fixedly anchored in the material of the panel member 1. The end of the shaft or spindle 21 which is at the right in FIG. 2 is mounted with a sliding fit in a mounting bush or sleeve 25 which is also fixedly embedded in the material of the panel member 1. Both the screwthreaded bush or sleeve 22 and also the mounting bush or sleeve 25 comprise metal. For the purposes of screwing the shaft or spindle 21 into the screwthreaded bush or sleeve 22, the end portion of the shaft or spindle 21 which is at the right in FIG. 2 is provided with a hexagonal recess 24 which is accessible by way of a suitably disposed opening in the right-hand outside edge of the panel member 1, for receiving a suitable tool.

Each guide roller 30 is mounted axially slidably on the associated shaft or spindle 21 by way of the two inner bearing races of the two rolling bearing assemblies 31 and 32 so that the guide roller 30 can shift axially on the shaft or spindle 21. As can be seen from FIG. 2, for that purpose the length of the guide roller 30 as measured in its axial direction is less than the corresponding dimension or width of the opening 20 in the panel member 1. Disposed between the end face of the guide roller 30 which is towards the right in FIG. 2, and the adjacent vertical side surface 11 of the opening 20, on the shaft or spindle 21, is a spring arrangement in the form of a pack of plate springs 34 which is supported at one end against the mounting bush or sleeve 25 and at the other end against the inner bearing race of the rolling bearing assembly 32. The spring arrangement 34 biases the guide roller 30 in a rest condition towards a position of bearing against the screwthreaded bush or sleeve 22, so that the right-hand end face of the roller 30 is held at a spacing from the vertical side surface 11 of the opening 20. That ensures that the guide portion 99 on the freight container 100 is held at a spacing from the guide bar portion 10 during the conveying movement of the freight conveyor, by virtue of the guide shoulder 33 bearing against the guide portion 99 on the freight container 100, thereby preventing frictional engagement between the guide bar portion 10 and a part of the freight container 100. If however in operation and in particular while in flight, substantial forces are applied to the freight container 100 and are also transmitted to the respective guide rollers 30, then each of the guide rollers 30 will be correspondingly displaced on its mounting shaft or spindle 21 against the force of the spring arrangement 34 so that the guide portion 99 on the freight container 100 comes into contact with the guide bar portion 10. The guide bar portion 10 is thus effective to carry the forces applied to the container 100 so as to prevent the container 100 from being substantially shifted in a lateral direction. The portion 13 of each guide bar portion 10 also prevents the container 100 from being displaced in a vertical direction.

It will be appreciated that the conveyor track and guide arrangement described above have been set forth solely by way of example and illustration of the principles of the present invention and that various modifications and alterations may be made therein without thereby departing from the spirit and scope of the invention.

What is claimed is:

1. A guide arrangement for a conveyor track having a panel means with side edges extending in the longitudinal direction of the conveyor track, the guide arrangement comprising guide bar portions which extend along respective ones of the side edges of the panel means of the conveyor track in the conveying direction at least over a part of the length of the respective side edges and which are of an inverted substantially L-shaped cross-section, adapted to engage over a portion of an article to be conveyed on the conveyor track, a plurality of openings in said panel means at spacings from each other along and adjacent to the respective guide bar portions, guide rollers which are freely rotatably mounted transversely to the direction of conveying movement in respective ones of said openings, the guide rollers each providing a circumferential surface which projects above the surface of said panel means and each guide roller having at an end thereof which is towards the adjacent said guide bar portion an enlarged-diameter guide shoulder adapted during a conveying operation to guide said portion of a said article at a spacing relative to the respective guide bar portion, and means axially displaceably mounting each said guide roller and spring means biasing each said guide roller away from the respective guide bar portion, wherein said spring means is a plate spring means.

2. A guide arrangement as set forth in claim 1 wherein said plate spring means comprises a pack of plate springs.

3. A guide arrangement as set forth in claim 1 wherein each said guide bar portion is formed integrally with said panel means from a composite fiber material.

4. A guide arrangement as set forth in claim 1 wherein each said guide roller comprises a composite fiber material.

* * * * *